May 28, 1946. W. C. BAUER 2,401,039
FILTERING DEVICE
Filed Feb. 14, 1942 2 Sheets-Sheet 1
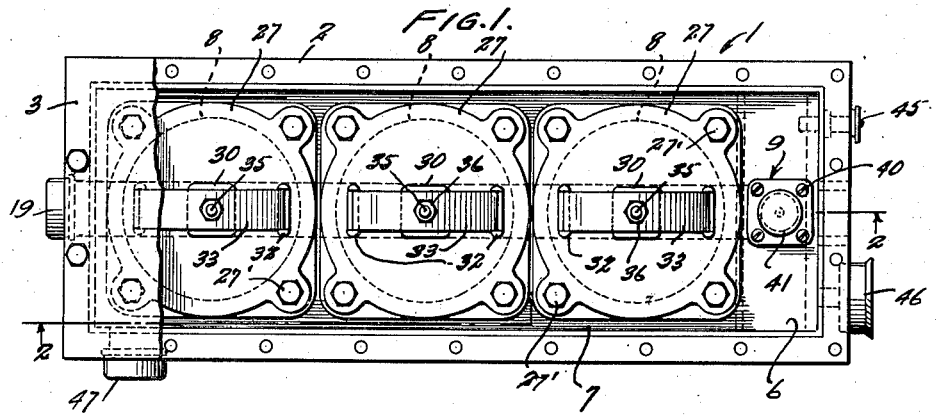
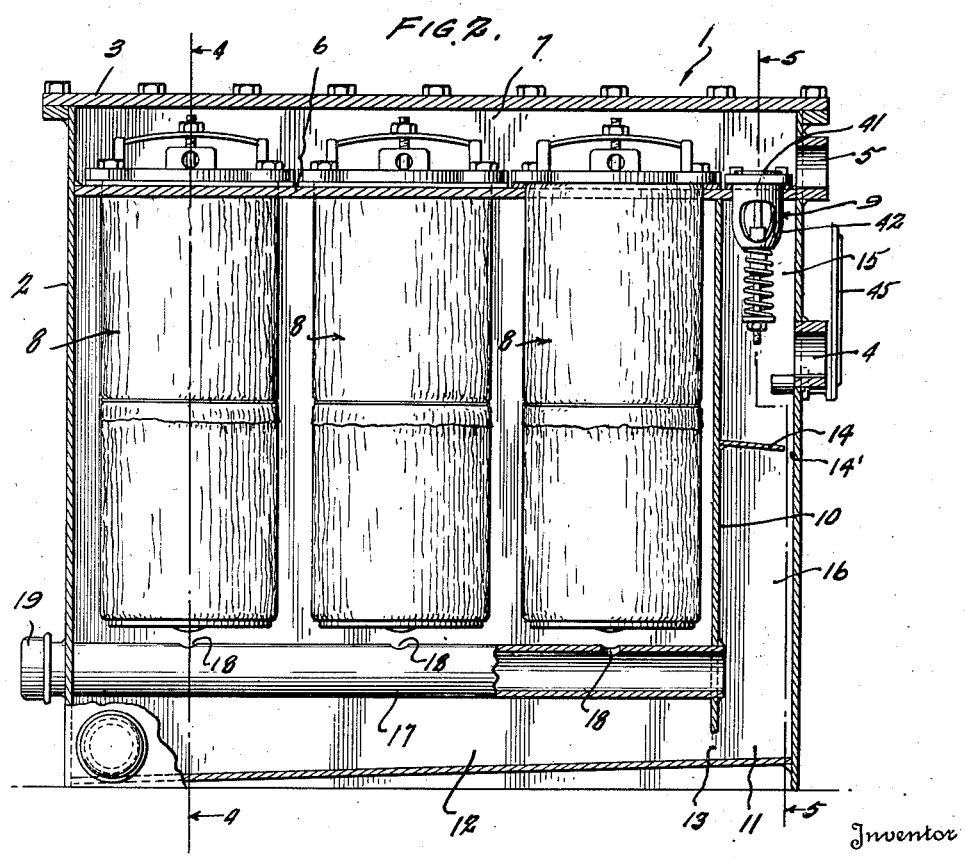
Inventor
WALTER C BAUER
By Semmes, Keegin, Beale & Semmes
Attorneys

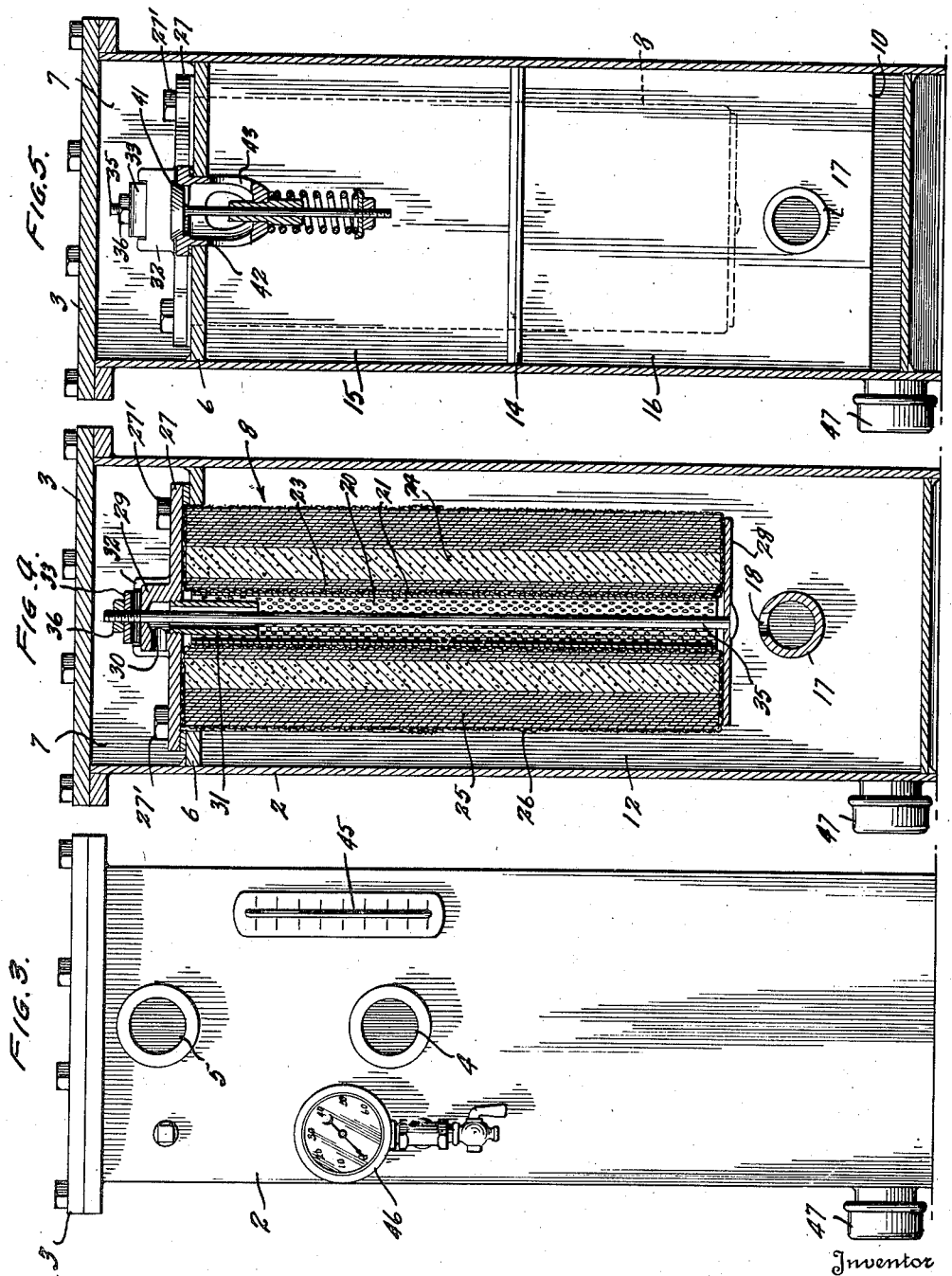

Patented May 28, 1946

2,401,039

UNITED STATES PATENT OFFICE 2,401,039

FILTERING DEVICE

Walter C. Bauer, Chevy Chase, Md., assignor, by mesne assignments, to The Briggs Filtration Company, Bethesda, Md., a corporation of Maryland Application February 14, 1942, Serial No. 430,961

10 Claims. (Cl. 210—184)

This invention relates to the purification of lubricating oil, and more particularly to a method of purifying oil in the lubricating system of an internal combustion engine and an oil purifier unit which may be used in this process.

Hitherto, although oil purifier units have been used extensively in connection with the lubricating systems of internal combustion engines, the presence of cold oil in the system results in a lowered efficiency of the filters due to increased viscosity of the oil. Therefore, the filters are totally inoperative or operate at a very low efficiency when the engine is first placed in operation. This loss in efficiency is not recovered until the heat generated by the engine has had sufficient time to raise the temperature of the entire body of oil in the system to a point at which the viscosity of the oil will be materially decreased.

Moreover, the oil in these lubricating systems contains a quantity of air, the presence of which tends to flutter the filtering units during the filtering operation. This action causes accumulated dirt to be dislodged from the filters and contaminate the oil.

One of the objects of this invention is to avoid the above-mentioned disadvantages of the prior art.

Another object of this invention is to provide a purifier unit which contains means to by-pass, around the filters, the portion of the oil from the engine which contains air.

Yet another object of this invention is to provide an oil purifier unit in which heated incoming oil is brought into direct contact with the filters, thereby enabling the purifier unit to operate at maximum efficiency under all conditions.

A further object of this invention is to provide a method of purifying lubricating oil in which the portion of the incoming oil containing air is by-passed around the filters and the remaining portion is brought into direct contact with the filters.

With these and other objects in view, this invention embraces broadly the concept of increasing the efficiency of purifying units, for lubricating oil, by providing means to by-pass the portion of the incoming oil containing air around the filters and enabling the remainder of this oil to come into direct contact with the filters. In this manner flutter of the filters due to the presence of air in the oil is eliminated and the filters will operate efficiently as soon as the engine is placed in operation, irrespective of the temperature of the major portion of the oil in the system.

In the preferred form of the invention the purifier unit is connected directly to the lubricating system of the engine and means are provided to by-pass the foamy portion of the incoming oil, which contains air, around the filtering units and return it to the engine. After this separation, the remainder of the heated oil is directed to the filtering units, a part thereof entering a distribution manifold through which it is forced to discharge ports which are positioned directly beneath each of the filtering units which are mounted in the oil storage compartment.

The hot oil is then forced under low pressure through the discharge ports into the body of storage oil which surrounds the filters. If a difference in temperature exists between this newly introduced oil and the storage oil, as will be the case if the engine has recently been started or is operating under abnormal climatic conditions, the new oil, due to its heat content, will rise upwardly through the storage oil to the bottom of the filters. This upward movement of the hot oil will continue until the side walls of the filters have been completely blanketed. At this point the oil, due to its lower viscosity, passes readily through the filters, and returns to the lubricating system. In this manner a constant purification of oil is carried on irrespective of the condition under which the engine is operated. Moreover, because of the low pressure employed, the new oil passes through the body of the storage oil without causing turbulence.

In the drawings:

Figure 1 is a view in top plan of the oil purifier unit which forms the basis of this invention, the top cover of said unit being partly broken away to disclose the filters.

Figure 2 is a view taken along line 2—2 of Figure 1, looking in the direction of the arrows.

Figure 3 is a side elevational view of the purifier unit.

Figure 4 is a view taken along line 4—4 of Figure 2, looking in the direction of the arrows.

Figure 5 is a view taken along line 5—5 of Figure 2, looking in the direction of the arrows.

For purposes of illustration I have shown in the drawings a clarifier unit, generally indicated by the numeral 1, which comprises an enclosed housing 2 consisting of a bottom, side walls and a removable top closure member 3. One of the side walls of the casing 2 is provided with an inlet port 4 and a superposed outlet port 5 which are designed to be connected, by means not shown, to the lubricating system of an engine. Preferably this oil clarifying unit is interposed between a sump scavenging pump and an oil supply tank in the lubricating system.

The interior of the housing 2 is provided with a horizontally extending shelf 6 which is mounted on the interior surfaces of the four walls of the housing 2 at a point slightly below the outlet aperture 5, thereby forming with the upper closure member 3 an oil return compartment 7 which is bled by the outlet port 5. The shelf 6 is provided with apertures through which extend one or more oil filters 8, of the cartridge type, and a check valve 9.

Carried by and extending downwardly from the under surface of the shelf 6 is a baffle 10 which sub-divides the lower portion of the housing 2 into chambers 11 and 12. The baffle terminates at the point above the bottom portion of the casing 2, thereby forming a slot 13 which connects these chambers. A horizontally extending baffle 14 is mounted on the baffle 10 and subdivides the compartment 11 into an upper compartment 15 and a lower compartment 16, operatively connected by the slot 14'.

A distribution manifold 17 is suspended between and extends through the baffle 10 and the side wall of the casing 2 which is opposite the side wall containing the inlet port 4. The manifold 17 therefore extends longitudinally across the chamber 12 directly below the filters 8 and is provided with a plurality of discharge ports 18, each of which is positioned beneath a filter 8 and is designed to discharge the oil in an upward direction. The outer extremity of the manifold 17 is provided with a removable cap 19, designed to be removed when the manifold 17 is to be cleaned.

The filter elements 8 may be of any suitable design. For example, as best shown in Figure 4, each of the filter elements may consist of a perforated metal tube 20 surrounded by a fabric stocking 21 and a layer of cellulosic wadding 23. These layers are in turn enclosed by a cylinder 24 of an adsorbent material, such as bauxite or fuller's earth, the exterior of which is wrapped with an additional layer of cellulosic wadding 25. The stocking 21 is brought over the ends of the assembled filter, then over the cellulosic wadding layer 25 as shown at 26.

The member 27 is provided with a boss 29 having a channel 30 which connects the upper extremity of the perforated tube 20 with the upper compartment 7. There is also provided a conduit 31 which is carried by the boss 29 and extends from the lower extremity of the channel 30, a short distance into the perforated tube 20. The plate 27 is also provided with a pair of lugs 32 between which is tensioned a leaf spring 33.

The plate 28 is supported by a rod 35 which extends through the perforated tube 20, the conduit 31 and an aperture in the leaf spring 33. The threaded extremity of the rod 35 is secured by a nut 36 by means of which the rod may be shortened, thereby exerting spring tension on the plate 28.

As best shown in Figure 5, the by-pass valve 9 is secured to the shelf 6 as shown at 40 and operatively connects the air separation compartment 15 with the return chamber 7. This by-pass means 9 may be in the form of a spring loaded valve 41 mounted in a cage 42 provided with a plurality of apertures 43 which communicate with the compartment 15. This valve may be regulated to operate under any desired pressure, but preferably greater pressure is required to operate the valve than would be normally required to force the oil through the cartridges 8, thereby preventing short-circuiting of the incoming oil.

The purifier unit 1 may also be provided with a temperature indicating device 45 and a pressure indicating device 46. These devices are mounted adjacent the inlet port 4 in order that the temperature of the oil entering the clarifier unit 1 and the pressure within the air separation compartment 15 can be readily ascertained. A sump plug 47 which also extends exteriorly of the housing 2, is designed for use in draining the storage compartment 12.

In operation, when the engine is started, the oil is withdrawn from the engine sump and forced at a relatively low pressure into the purifier through the inlet port 4 into the compartment 15. In this compartment the foam and air laden oil rise to the top of the compartment 15 while the air free oil moves past the baffle 14 down into the compartment 16.

From this point the air free oil enters the distribution manifold 17 and passes upwardly through the ports 18. This oil, being warmer than the oil in the storage compartment 12, rises upwardly around the exterior walls of the units 8, in the manner which has previously been described, and is then forced radially inward through the filtering elements to the perforated tubes 20. In passing through the filters 8, the solids and impurities in the oil are removed and the clean oil passes through the discharge channels 30, into the return compartment 7.

The spring loaded relief valve 9 is set at a pressure differential which will maintain a working pressure on the filter units 8 that will result in the most efficient cleaning of the oil. When the relief valve 9 is forced open, by an increase in this pressure, the air and foam trapped in compartment 15 will be bled into the return compartment 7, together with any quantity of the air free oil, which may be necessary to relieve the pressure in the purifier sufficiently to permit the valve to close.

After reaching the return compartment 7, both the filtered oil and the bypassed oil return through the port 5, to the lubricating system of the engine. The sludge from the contaminated oil settles to the bottom of the housing 2 from which it may be periodically withdrawn through the sludge drain 47.

In view of the fact that the temperature of the oil in the engine will increase more rapidly than that of the oil in the remainder of the system, it is believed to be apparent that the present invention will operate with greater efficiency than the purifying units which have previously been used. This increased efficiency will reduce the wear of moving parts and enable the engine to operate normally shortly after starting, even under adverse climatic conditions. The removal of air from the oil before filtering is also important as this removal prevents contamination of the oil and much of the accumulated waste can be removed from the system by replacement of the old filters.

While for purposes of illustration one type of purifier construction has been shown, it is believed obvious that various changes may be made in the internal and external construction of the device, by one skilled in the art, without departing from the spirit of the invention.

I claim:

1. A device for purifying the lubricating oil of an engine comprising a housing, a partition dividing the housing into an upper and a lower compartment, a second partition extending downwardly from the first mentioned partition and dividing the lower compartment into a storage compartment and an oil reception compartment, an inlet port associated with the oil reception compartment, means in said reception compartment to by-pass the portion of the incoming heated oil containing air into the upper compartment, a plurality of filters in the storage compartment, said filters communicating with the upper compartment, an oil distributing means communicating with the reception compartment and extending laterally into the storage compartment above the bottom of the latter, said means having ports to discharge at least a part of the remaining portion of the oil upwardly into the oil storage compartment whereby the heated oil will rise upwardly through the storage oil and pass through the filters.

2. A device for purifying the lubricating oil of an engine comprising a housing, a partition dividing the housing into an upper and a lower compartment, a baffle extending downwardly from the partition, said baffle dividing the lower compartment into a storage compartment and an oil reception compartment, means in said oil reception compartment to by-pass the portion of the heated incoming oil containing air into the upper compartment, when the pressure within the purifier is increased, a plurality of filters in the storage compartment, said filters extending through the partition and discharging into the upper compartment, oil distributing means communicating with the oil reception compartment and extending laterally into the storage compartment above the bottom of the latter beneath the filters, said means being provided with a plurality of ports, each of said ports being positioned beneath one of the filters and adapted to discharge at least a part of the remaining portion of the oil upwardly into the oil storage compartment whereby the heated oil will rise upwardly through the storage oil and pass through the filters.

3. A device for purifying lubricating oil of an engine comprising a housing, a horizontally extending partition dividing the housing into an upper and a lower compartment, an outlet port for said upper compartment, a baffle attached to the partition and extending downwardly into the lower compartment, said baffle dividing the lower compartment into a storage compartment and an oil reception compartment, means in said oil reception compartment to by-pass the portion of the heated incoming oil containing air into the upper compartment, said means extending through the partition wall, a plurality of filters mounted in the storage compartment, said filters extending through the partition and discharging into the upper compartment, a distributing conduit communicating with the reception compartment and extending longitudinally across the storage compartment above the bottom of the latter and beneath the filters, and a plurality of ports in the said conduit, each of said ports being positioned beneath one of the filters to discharge at least a part of the remaining portion of the heated oil upwardly into the storage compartment whereby the heated oil will rise upwardly through the storage oil and pass through the filters.

4. A device for purifying lubricating oil comprising a housing, a horizontally extending partition dividing the housing into upper and lower compartments, a baffle extending downwardly from the partition to a point adjacent but spaced from the bottom of the lower compartment and dividing said lower compartment into a storage compartment and an oil reception compartment, a plurality of filter elements carried by said partition and extending downwardly from said partition into the storage compartment, each of said filter elements having its filtrate discharge extending through the partition for the discharge of filtrate into said upper comparment, a conduit communicating with the lower portion of said reception compartment at a region above the lower end of said baffle and extending laterally into said storage compartment, said conduit having a plurality of ports in the upper portion thereof positioned immediately beneath the filter elements for discharging oil upwardly toward said filter elements, means for introducing oil to be filtered into the upper portion of said reception compartment, said partition having a port placing the upper compartment in communication with the oil reception compartment, a pressure responsive valve closing said last mentioned port, and means for discharging oil from said upper compartment.

5. An oil clarifier comprising an oil reception compartment normally closed at the top for the reception and separation of oil into air-containing and air-free portions, means for introducing oil into said reception compartment at a region between the upper and lower portions thereof, a filtering compartment in communication with the lower portion of the oil reception compartment, a filtered oil compartment provided with means to receive oil after filtration, and means in the upper portion of the reception compartment to pass air-laden oil directly from the upper portion of said reception compartment to the filtered oil compartment to thereby by-pass the filtering compartment.

6. An oil clarifier comprising an oil reception compartment normally closed at the top for the reception and separation of oil into air-containing and air-free portions, means for introducing oil into said reception compartment at a region between the upper and lower portions thereof, a filtering compartment in communication with the lower portion of the oil reception compartment, a filtered oil compartment provided with means to receive oil after filtration, means in the upper portion of the reception compartment to pass air-laden oil directly from the upper portion of said reception compartment to the filtered oil compartment to thereby by-pass the filtering compartment, and other means, including a baffle in the reception compartment, tending to prevent the passage of air-laden oil from the reception compartment to the filtering compartment.

7. An oil clarifier comprising a container adapted to hold a body of oil, a filter cartridge suspended within the body of oil and spaced from the side walls of the container, means for supplying oil to the oil body at a point directly beneath and adjacent to the horizontal center of the cartridge but above the bottom of the oil body and controlling the amount of oil supplied to prevent turbulence in the oil body, means for passing oil from said body horizontally through the cartridge, means for removing oil from the cartridge after passage therethrough, and a closed bottom for the cartridge free from projections which would deflect flow of oil from the said point of supply to the perimeter of the cartridge bottom, whereby the side walls of the cartridge are shrouded with freshly supplied oil.

8. An oil clarifier comprising a container adapted to hold a body of oil, a plurality of filter cartridges suspended within said container and spaced from the side walls thereof, means for supplying one quantity of oil to the oil body, other means for supplying additional amounts of oil to said body at points directly beneath and adjacent to the horizontal center of each cartridge but above the bottom of the oil body, the amount of oil supplied by the second supply means being insufficient to cause turbulence in the oil body, means for passing oil from said body horizontally through the cartridges, means for removing oil from the cartridges after passage therethrough, and a closed bottom for each cartridge free from projections which would deflect flow of oil from the points of supply by said second supply means to the perimeters of the respective cartridge bottoms, whereby the side walls of the cartridges are shrouded with the oil from said second supply means.

9. An oil clarifier comprising a container adapted to hold a body of oil, a plurality of filter cartridges suspended within the body of oil and spaced from the side walls of the container, means for supplying one quantity of oil to the oil body at the lower portion thereof, a manifold above the point of such supply and extending beneath the base of the cartridges, a plurality of ports in the manifold, each port being directly beneath and adjacent to the horizontal center of each cartridge, means for supplying the manifold with oil, means for passing oil from the oil body horizontally through the cartridge, means for removing oil from the cartridge after passage therethrough, and a closed bottom for each of the cartridges free from projections which would deflect flow of oil from the manifold port to the perimeter of the respective cartridge bottom, whereby the side walls of the cartridges are shrouded with freshly supplied oil from the manifold ports.

10. An oil clarifier comprising a container adapted to hold a body of oil, a plurality of filter cartridges suspended within said container and spaced from the side walls thereof, a compartment for the receipt of oil to be clarified and in relatively open communication with the lower portion of the body of oil, a manifold in communication with the reception compartment and extending horizontally beneath the base of the filter cartridges but above the bottom of the body of oil, a plurality of ports on the top of the manifold, each port being directly beneath and adjacent to the horizontal center of each cartridge, means for passing oil from said body horizontally through the cartridge, means for removing oil from the cartridge after passage therethrough, and a closed bottom for each cartridge free from projections which would deflect flow of oil from the adjacent manifold port to the perimeter of the cartridge bottom, whereby the side walls of the cartridges are shouled with freshly supplied oil from the manifold ports.

WALTER C. BAUER.